(12) United States Patent
Rennard et al.

(10) Patent No.: US 11,612,222 B1
(45) Date of Patent: Mar. 28, 2023

(54) SYSTEM AND METHOD FOR PROVIDING AN EARLY WARNING TO A VICTIM OF DOMESTIC VIOLENCE OR STALKING

(71) Applicant: LEEB Innovations, LLC, West Warwick, RI (US)

(72) Inventors: Carl J. Rennard, Lincoln, RI (US); Donna Kane, North Providence, RI (US); Leveland Brown, West Warwick, RI (US); Robert Iovino, Voluntown, CT (US)

(73) Assignee: LEEB INNOVATIONS, LLC, West Warwick, RI (US)

( * ) Notice: Subject to any disclaimer, the term of this patent is extended or adjusted under 35 U.S.C. 154(b) by 199 days.

(21) Appl. No.: 17/092,657

(22) Filed: Nov. 9, 2020

Related U.S. Application Data

(63) Continuation-in-part of application No. 16/883,096, filed on May 26, 2020, now abandoned.

(51) Int. Cl.
*H04W 4/029* (2018.01)
*G08B 21/02* (2006.01)
*G08B 23/00* (2006.01)
*A44C 5/20* (2006.01)
*G06F 3/01* (2006.01)

(52) U.S. Cl.
CPC ............ *A44C 5/2057* (2013.01); *G06F 3/011* (2013.01); *G08B 23/00* (2013.01); *H04W 4/029* (2018.02)

(58) Field of Classification Search
None
See application file for complete search history.

(56) References Cited

U.S. PATENT DOCUMENTS

| 4,424,611 | A | * | 1/1984 | Mori | A44C 5/246 24/DIG. 42 |
|---|---|---|---|---|---|
| 5,266,944 | A | | 11/1993 | Carroll et al. | |
| 5,396,227 | A | | 3/1995 | Carroll et al. | |
| 6,510,380 | B1 | | 1/2003 | Curatolo et al. | |
| 6,800,070 | B2 | | 10/2004 | Mazidji et al. | |
| 6,933,851 | B2 | | 8/2005 | Hahne et al. | |
| 6,999,295 | B2 | | 2/2006 | Watkins, III et al. | |

(Continued)

FOREIGN PATENT DOCUMENTS

| EP | 17188150.1 A1 | 3/2019 |
|---|---|---|
| WO | 2019048580 A1 | 3/2019 |
| WO | 2020197846 A1 | 10/2020 |

*Primary Examiner* — John F Mortell
(74) *Attorney, Agent, or Firm* — Schneider IP Law LLC; Laura Schneider

(57) ABSTRACT

A system for alerting a victim of a presence of an offender, the system includes a first bracelet configured to be worn by the victim, the first bracelet including a first GPS receiver, a first wireless network transceiver, a speaker or a vibration motor, and a display element, wherein the first wireless network transceiver comprises a wireless cellular network transceiver or a WiFi transceiver. The system also includes a second bracelet configured to be worn by the offender. A cloud-based monitor system including a computing device and a memory configured to receive data from the first bracelet and the second bracelet and perform appropriate actions as necessary. Each bracelet may include a mechanical lock having at least a first fastener, a second fastener, and/or a third fastener, to provide, respectively, one, two or three levels of security for the device.

17 Claims, 8 Drawing Sheets

(56) References Cited

U.S. PATENT DOCUMENTS

| | | |
|---|---|---|
| 7,102,870 B2 | 9/2006 | Nerheim |
| 7,145,762 B2 | 12/2006 | Nerheim |
| RE39,909 E * | 11/2007 | Taylor, Jr. ............. A61B 5/1112 |
| | | 379/38 |
| 7,570,476 B2 | 8/2009 | Nerheim |
| 7,580,237 B2 | 8/2009 | Nerheim |
| 7,586,733 B2 | 9/2009 | Nerheim |
| 7,602,598 B2 | 10/2009 | Nerheim |
| 7,782,592 B2 | 8/2010 | Nerheim |
| 7,800,885 B2 | 9/2010 | Brundula et al. |
| 7,916,446 B2 | 3/2011 | Nerheim |
| 8,451,131 B2 | 5/2013 | Ghazarian |
| 8,514,070 B2 | 8/2013 | Roper et al. |
| 8,879,232 B2 | 11/2014 | Ziriax et al. |
| 9,007,203 B2 | 4/2015 | Lee |
| 9,111,433 B2 | 8/2015 | Curatolo et al. |
| 9,386,438 B2 | 7/2016 | Hymowitz |
| 9,959,730 B2 | 5/2018 | Spikes |
| 10,007,962 B2 | 6/2018 | Brans |
| 10,480,909 B1 | 11/2019 | Brown |
| 2006/0244613 A1 | 11/2006 | Myers |
| 2017/0202180 A1 | 7/2017 | Yang |
| 2018/0020786 A1 | 1/2018 | Fernandes Demetrio et al. |
| 2018/0178757 A1 | 6/2018 | Fernandes Demetrio |
| 2019/0261135 A1 * | 8/2019 | Chen ..................... H04W 4/029 |

* cited by examiner

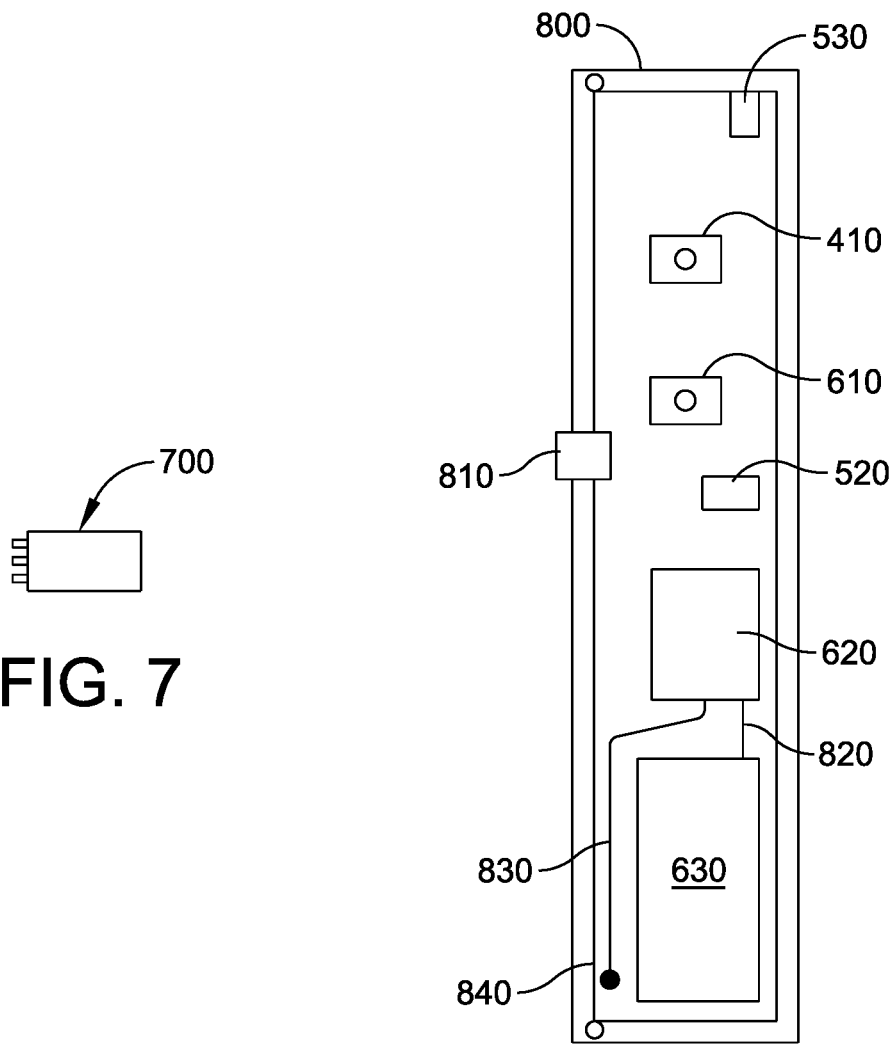
FIG. 7
FIG. 8
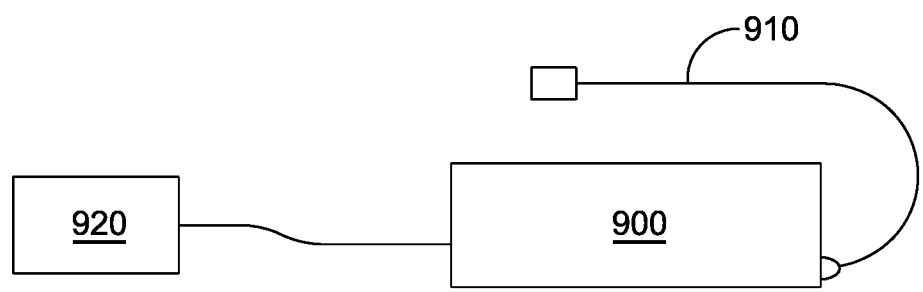
FIG. 9

SYSTEM AND METHOD FOR PROVIDING AN EARLY WARNING TO A VICTIM OF DOMESTIC VIOLENCE OR STALKING

CROSS-REFERENCE TO RELATED APPLICATION

This application is a continuation-in-part (CIP) of U.S. Ser. No. 16/883,096 filed on May 26, 2020 and which is incorporated by reference herein in its entirety.

FIELD OF THE INVENTION

The present invention relates in general to a system and method for providing an early warning to a domestic violence or stalking victim.

BACKGROUND OF THE INVENTION

There presently does exist various systems for providing warnings to a victim, for example, of domestic violence (DV), intimate personal violence (IPV), or personal stalking. Refer, for example, to U.S. Pat. No. 8,451,131 to Ghazarian, U.S. Pat. No. 9,959,730 to Spikes, U.S. Pat. No. 5,226,944 to Carroll et al., U.S. Pat. No. 5,396,227 to Carroll et al., and U.S. Pat. No. 9,007,203 to Lee. There are a number of drawbacks to existing systems such as the fact that generally only one style or type of alert is initiated in response to the geofence breach.

Accordingly, it is an object of the present invention to provide an improved early warning system and method to alert a victim and an offender of the immediate proximity of the offender with respect to the victim.

It is another object of the present invention to provide a micro lock on the bracelet that is locked with a coded digital key.

It is still another object of the present invention to provide different levels of alerts depending on particular preferences of the system, including at least two levels of alerts.

It is still another object of the present invention to provide an audible alarm on the offender bracelet which may be high decibel to alert the surrounding parties of the offender breach.

It is still another object to provide a mechanical locking system for the device.

It is still another object to provide at least two mechanical locking fasteners to secure the device onto the wearer.

It is still another object to provide at least three different mechanical locking fasteners to secure the device onto the wearer.

SUMMARY OF THE INVENTION

To accomplish the foregoing and other objects, features and advantages of the present invention there is provided a device configured to be worn by an offender for alerting a victim of a presence of an offender, the device having a locked position and an unlocked position, the device including a GPS receiver configured to receive positional data from a GPS satellite; a wireless network transceiver configured to transmit the positional data to a cloud-based monitoring system, wherein the wireless network transceiver comprises a wireless cellular network transceiver or a WiFi transceiver, a band having a main body portion, a hinged locking gate portion, and a hinged fastener portion, wherein the hinged locking gate portion includes an appendage that is configured to engage with a receiver in the main body portion when the device is in the locked position, and wherein the hinged locking gate portion includes a first opening on the appendage configured to receive a first fastener that secures the hinged locking gate portion to the main body portion, wherein the main body includes a second opening and the hinged fastener portion includes a third opening, such that the second opening and the third opening are both configured to receive a second fastener to thereby secure the hinged fastener portion to the main body when the device is in the locked position.

The device can further include a fourth opening on the main body that receives the first fastener to secure the hinged locking gate portion to the main body. The second and third openings can be perpendicular to the first and fourth openings when the device is in the locked position. The device can further include a third locking fastener configured to secure the main body portion to the hinged locking gate portion in a direction that is perpendicular to the first fastener. The main body can define a recessed portion that is recessed along at least three edges and to engage the hinged fastener portion when the device is in the locked position. The first fastener can be a first screw having a first type of screw head configured to receive a first specialized tool and the second fastener can be a second screw having a second type of screw head configured to receive a second specialized tool, different from the first specialized tool.

There can also be provided a device having a locked position and an unlocked position. The device can include a GPS receiver configured to receive positional data from a GPS satellite; a wireless network transceiver configured to transmit the positional data to a cloud-based monitoring system, wherein the wireless network transceiver comprises a wireless cellular network transceiver or a WiFi transceiver or other wireless network transceiver, a band having a main body portion, a hinged locking gate portion, and a hinged fastener portion, a first fastener that secures the hinged locking gate portion to the main body portion when the device is in the locked position, and a second fastener that secures the hinged fastener portion to the main body portion when the device is in the locked position.

The device can further include a third locking mechanism configured to secure the main body portion to the hinged locking gate portion in a direction that is perpendicular to the first fastener. The third locking mechanism can include a cylindrical base post and a flat top, wherein the cylindrical base post is configured to engage a hollow shaft to engage and disengage the third locking mechanism from the hinged locking gate portion. The first fastener can be perpendicular with respect to the second fastener when the device is in the locked position. The device can include a first hinge of the hinged locking gate portion is perpendicular to a second hinge of the hinged fastener portion. The first fastener can be configured to receive a first specialized tool and wherein the second fastener can be configured to receive a second specialized tool, different from the first specialized tool.

There can also be provided a device having a locked position and an unlocked position. The device can include a GPS receiver configured to receive positional data from a GPS satellite, a wireless network transceiver configured to transmit the positional data to a cloud-based monitoring system, wherein the wireless network transceiver comprises a wireless cellular network transceiver or a WiFi transceiver or other wireless network transceiver, a band having a main body portion, a hinged locking gate portion, and a hinged fastener portion, wherein the hinged locking gate portion is hinged to the main body along a first direction, and wherein the hinged fastener portion is hinged to the main body along a second direction that is perpendicular to the first direction.

The hinged locking gate portion of the device can include an appendage that is configured to engage with a receiver on the main body portion when the device is in the locked position. The device can further include a first opening on the appendage, a second opening in the receiver, a first fastener configured to be received through the first and second openings to secure the hinged locking gate portion to the main body portion when the device is in the locked position, a third opening on the hinged fastener portion, a fourth opening on the main body portion, and a second fastener configured to be received through the third and fourth openings to secure the hinged fastener portion to the main body portion when the device is in the locked position. The hinged fastener portion can overlap the first fastener and the first fastener can be perpendicular to the second fastener when the device is in the locked position. The device is unlocked by first unlocking the first fastener, then opening the hinged fastener portion, then unlocking the second fastener, and then opening the hinged locking gate portion. The device can further include a third locking fastener configured to secure the hinged locking gate portion to the main body portion in a direction perpendicular to the first fastener that is configured to secure the hinged locking gate portion to the main body portion. The third locking mechanism comprises a slide pin having a cylindrical base post and a flat top, wherein the cylindrical base post is configured to engage a hollow shaft to engage and disengage the third locking mechanism from the hinged locking gate portion. The device can further include an opening that accommodates the flat top of the third locking mechanism.

BRIEF DESCRIPTION OF THE DRAWINGS

It should be understood that the drawings are provided for the purpose of illustration only and are not intended to define the limits of the disclosure. In the drawings depicting the present invention, all dimensions are to scale. The foregoing and other objects and advantages of the embodiments described herein will become apparent with reference to the following detailed description when taken in conjunction with the accompanying drawings in which:

FIG. 7 is a perspective view of the digital locking key used in conjunction with the bracelet, according to the present disclosure;

FIG. 8 is a plan view of an internal component of the bracelet shown on the printed circuit board, according to the present disclosure;

FIG. 9 is a perspective view of an external battery and charging unit used in conjunction with the bracelet, according to the present disclosure;

DETAILED DESCRIPTION

The present disclosure relates to a system and method for alerting a victim and an offender of the immediate proximity of the offender with respect to the victim. The system includes a first bracelet configured to be worn by a victim and a second bracelet configured to be worn by an offender. Each bracelet can include a GPS receiver, a wireless network transceiver (e.g., WiFi, cellular), a speaker, and a LED light source or other display element. Each bracelet can be configured to be tamperproof by means of a tamper wire. The system and method provide several levels of alerts that can include at least three levels of alerts. A first level of alert can include a vibration alert on both the victim bracelet and the offender bracelet. A second level of alert can include a flashing LED light on the victim bracelet and the offender bracelet. At the second level of alert, the authorities can also be contacted, as well as other third parties.

A third level of alert can include a high decibel, audio alert on the offender. The system and method are shown and described in greater detail in the following description and accompanying drawings. Although shown and described generally herein as a "bracelet" the systems, devices, and techniques disclosed herein may be applied to an anklet, a headband, or any other device that can be configured to be worn or otherwise secured to an individual (whether an offender or a victim).

Figure 1:
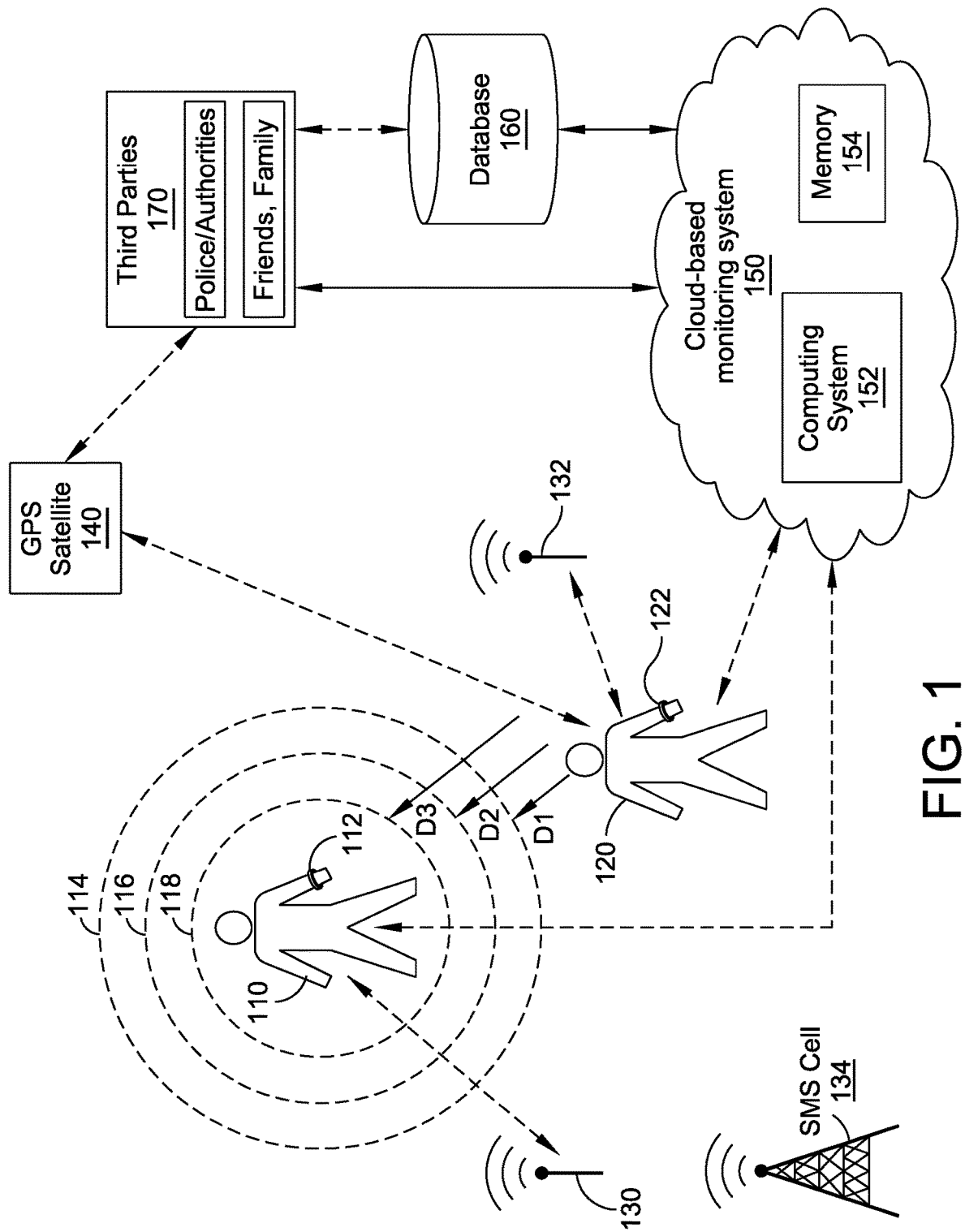
FIG. 1 is a block diagram of a system for alerting a victim, an offender, and other third parties of the proximity of an offender, according to an embodiment of the present disclosure.

FIG. 1 is a block diagram of a system for alerting a victim, an offender, and other third parties of the proximity of an offender, according to an embodiment of the present disclosure. In the system, the victim 110 and the offender 120 are each respectively provided with a bracelet 112, 122. The bracelet 112, 122 may be tamper-proof for both the victim 110 and the offender 120 in some embodiments. The bracelet may be removable by the victim 110 yet tamper-proof and not removable by the offender 120. The victim 110 has a floating geofence, which can include at least three geofence perimeters 114, 116, and 118. The first geofence perimeter 114 can be used to initiate a first type of alert, the second geofence perimeter 116 can be used to initiate a second type of alert, and the third geofence perimeter 118 can be used to initiate a third type of alert. As will be appreciated in light of the present disclosure, greater or fewer than three geofence perimeters can be implemented. The first geofence perimeter 114 is breached when the offender 120 comes within a first predetermined distance (D1) of the victim 110. This first distance D1 can, for example, be 50 feet or any value in the range of 20-150 feet, depending upon the particular requirements for a particular offender to keep a particular distance away from a particular victim. The second distance D2 is intended to be a distance shorter than D1, and can for example be 25 feet, or any value in the range of 10-50 feet. The third distance D3 is intended to be the shortest distance, shorter than both D2 and D1, and for example can be 10 feet, or any value in the range of 0-25 feet. As will be described in greater detail herein, each geofence can provide a different type of alert to provide multiple levels of security within the system.

The geofence parameters can be mandated by local court authorities to establish safe zone distances for both the victim and the offender. The bracelets are activated when attached to the wrist of each party. The intention is to have both parties aware of any violation of court ordered boundaries established to protect a victim from the offender.

In the system, the bracelets 110, 112 can be configured to be WiFi, Cellular, and GPS enabled so that they can communicate with local WiFi hotspots 130, 132; as well as with Cellular towers 134 (i.e., via SMS message or cellular phone call); and as well as with GPS satellite 140 via GPS receiver within the bracelets 110, 112 (see FIG. 8 showing GPS, cellular, and WiFi antenna 830 within the bracelet 110, 112).

The bracelets 110, 112, are also each in communication with a cloud-based monitoring system 150 that includes a computing system 152 and virtual memory 154. As will be described in greater detail herein, the cloud-based monitoring system 150 is configured to initiate the various alerts at the appropriate times based on the various data received from the bracelets, and the data stored in memory and/or pulled from a database 160. The database 160 can be a physical database or a virtual database. The bracelets worn by both the victim and the offender are linked together by satellite enabled data transmission residing on a cloud-based system. This system and bracelets are monitored 24 hours a day by vetted, experienced, monitoring and tracking companies. Monitoring operators at the cloud-based monitoring system can also contact the offender and victim by phone in the event of safe zone incursions. After a first alert notification the offender must vacate course issued safe zone area. The offender and victim are viewed and tracked for offender compliance. If the offender complies, then the alerts are canceled and reset. All violations of the geofence parameters are recorded for review should the courts deem it necessary.

The cloud-based monitoring system 150 can be further configured to communicate with third parties 170, such as police or other authorities, as well as friends and family. The cloud-based monitoring system 150 can integrate location of friends and family so that any friends and/or family members that are closest to the victim 112 can be alerted first. In an example implementation, for the first geofence 114 violation, the first alert is initiated which can comprise a vibration on both bracelets. This first alert can be provided with or without notice to the third parties 170. Then if the second geofence 116 is breached then the third parties 170 can be notified, which can include police or other authorities. Friends and family members can also be notified if the second geofence 116 is breached. Finally, if the third geofence is breached, then a high decibel sound can be initiated on the offender bracelet 122, and flashing LED can be initiated on the offender bracelet. It will be appreciated that these are only example alerts and these can be adapted and modified as appropriate to provide at least two or three (or more) different level of protection and security for the victim.

By providing a GPS receiver on both the victim and the offender, the precise location of both the victim and the offender can be transmitted to the cloud-based monitoring system, so that this information can be relayed to authorities if necessary. This also allows for third parties, or other individuals in close proximity to the victim to be alerted based on the GPS location of the victim and/or the offender.

Figure 2:
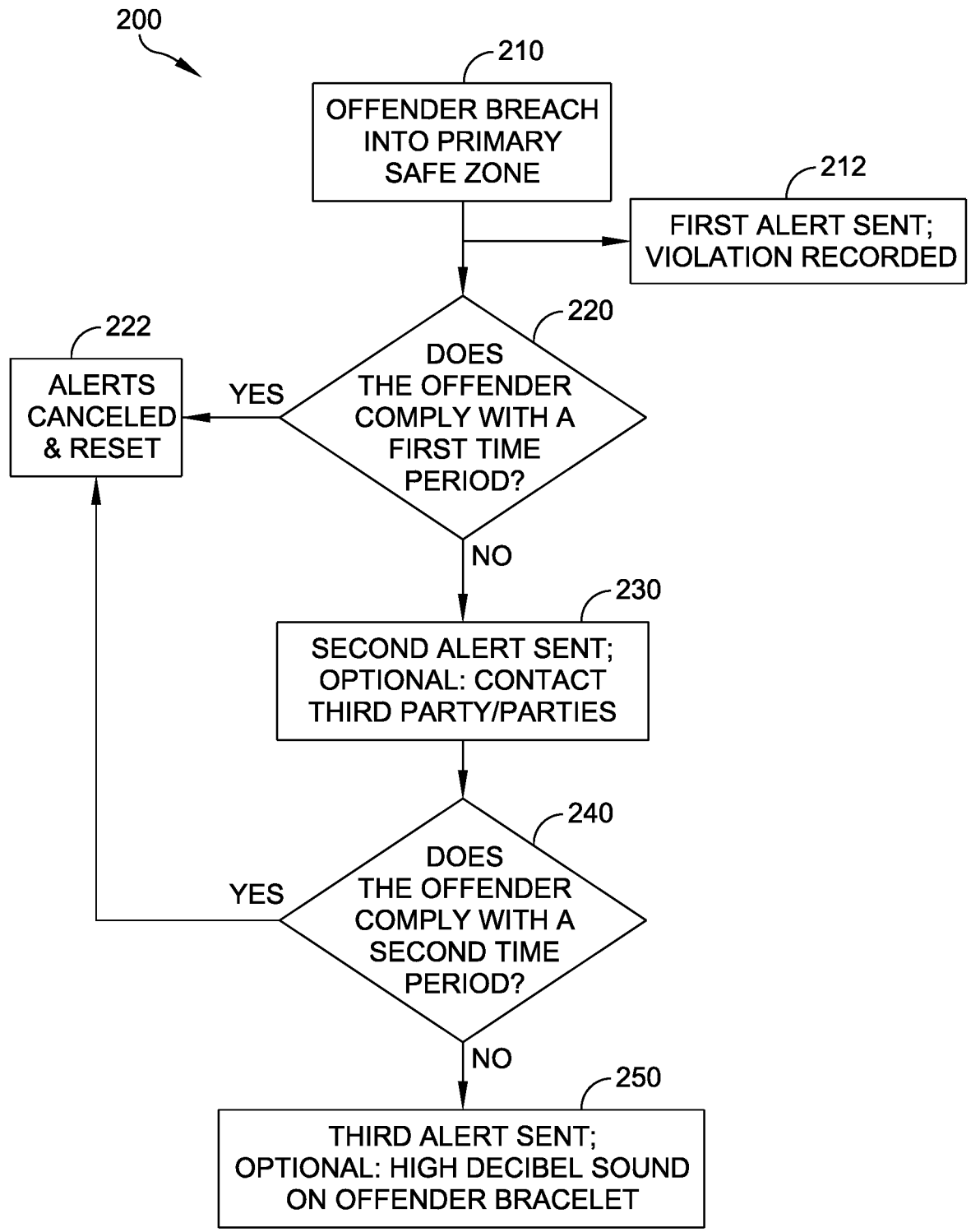
FIG. 2 is a flow chart of a method implemented by the system, according to the present disclosure.

FIG. 2 is a flow chart of a method 200 implemented by the system (for example, the system shown in FIG. 1), according to the present disclosure. The method can be implemented, for example, by the cloud-based monitoring system 150 shown in FIG. 1. At block 210, the offender breaches into the primary safe zone, which for example can be the first geofence perimeter 114 shown in FIG. 1. This initiates a first alert at block 212 and the violation is recorded. The first alert can be a vibration initiated on both the victim bracelet and the offender bracelet, or other initial alert. For example, the victim and the offender could both be sent an SMS message that could be displayed on each parties cell phone app provided by the GPS, cell, and WiFi monitoring system, company.

At block 220, the method queries whether the offender has complied with leaving the first geofence within a first time period (e.g., a number of seconds or minutes). If the offender leaves the first geofence in response to the first alert, then the method advances to block 222 and the alerts canceled and reset. If the offender does not comply within the first time period, then a second alert is initiated at block 230. At this block 230, a third party or third parties can be contacted. The third parties, for example, can include police, other authorities, friends, or family members. At this juncture, local authorities can follow their existing protocol for such incidents. At block 240, the method queries whether the offender has complied with leaving the second geofence within a second time period (e.g., a number of seconds or minutes, which may be the same as, less than, or greater than, the first time period). If the offender leaves the second geofence in response to the second alert, then the method advances to block 222 and the alerts are canceled and reset. If the offender does not comply within the second time period, then a third alert is initiated at block 250. The third alert can include a high decibel sound on the offender bracelet.

Figure 3:
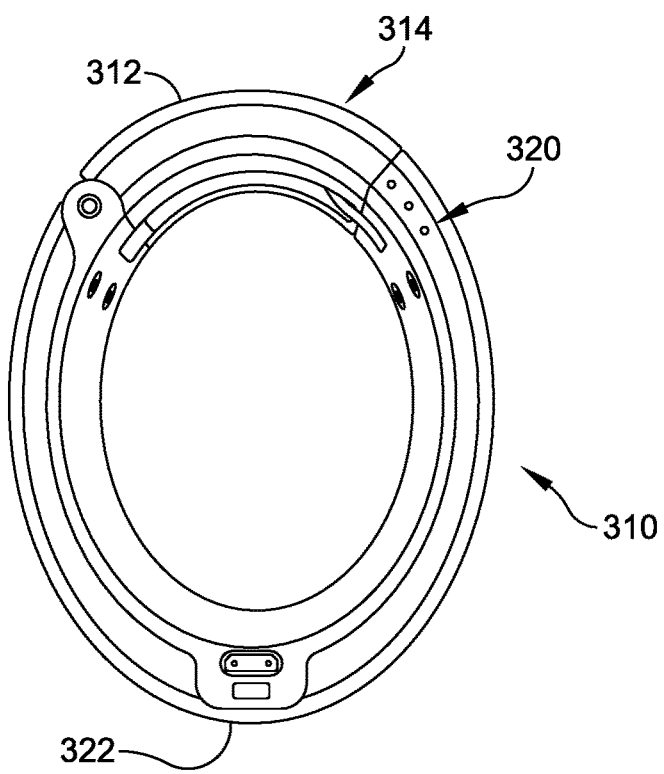
FIG. 3 is a side view of a bracelet, shown in a closed position with the hinge lock engaged, according to the present disclosure.

FIG. 3 is a side view of a bracelet 310, shown in a closed position with the hinge lock engaged, according to the present disclosure. The bracelet 310 can be the same as the bracelet 112 worn by the victim 110 or the bracelet 122 worn by the offender 120. In some embodiments, the victim 110 may have a simpler bracelet which may not include all of the features of the offender bracelet, such as being able to be removed by the victim.

The bracelet 310 includes a hinged locking gate 312 and a folding double lock 314. The folding double lock 314 has two parts, shown in greater detail in FIG. 4 (interlocking receiver 420 and interlocking appendage 422). The bracelet 310 includes a locking key port 320 which can receive a digital coded key (see for example the coded key 700 shown in FIG. 7). The locking key port and digital coded key are used to lock and unlock the bracelet onto the victim or the offender via the folding double lock 314 (including the receiver 420 and appendage 422 shown in FIG. 4). Retuning to FIG. 3, the bracelet 310 also includes a charging port 322 for recharging the battery on the bracelet 310 (see, e.g., battery 630 in FIG. 6).

Figure 4:
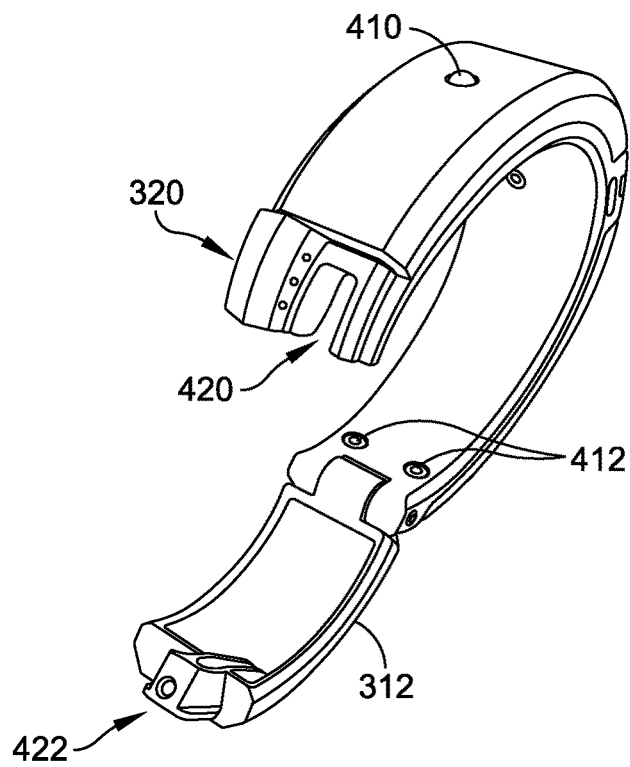
FIG. 4 is a perspective view of the bracelet of FIG. 3 shown in an open position with the hinge lock unlocked, according to the present disclosure.

FIG. 4 is a perspective view of the bracelet 310 of FIG. 3 shown in an open position with the hinge lock unlocked, according to the present disclosure. The LED light source 410 for the bracelet 310 is shown in FIG. 4. The LED light source 410 can be used to provide an alert to the offender and/or the victim, such as a flashing LED light. The attachment screw holes 412 are for attaching the outer piece to the inner shell (see inner shell 510 shown in FIG. 5). The folding double lock 314 includes a locking intersection receiver 420 and a locking intersection appendage 422. These are locked together and unlocked via a digital coded key, as will be appreciated in light of the present disclosure. The locking intersection receiver 420 and the locking intersection appendage 422 can form a male/female connection or other appropriate form of connectivity.

Figure 5:
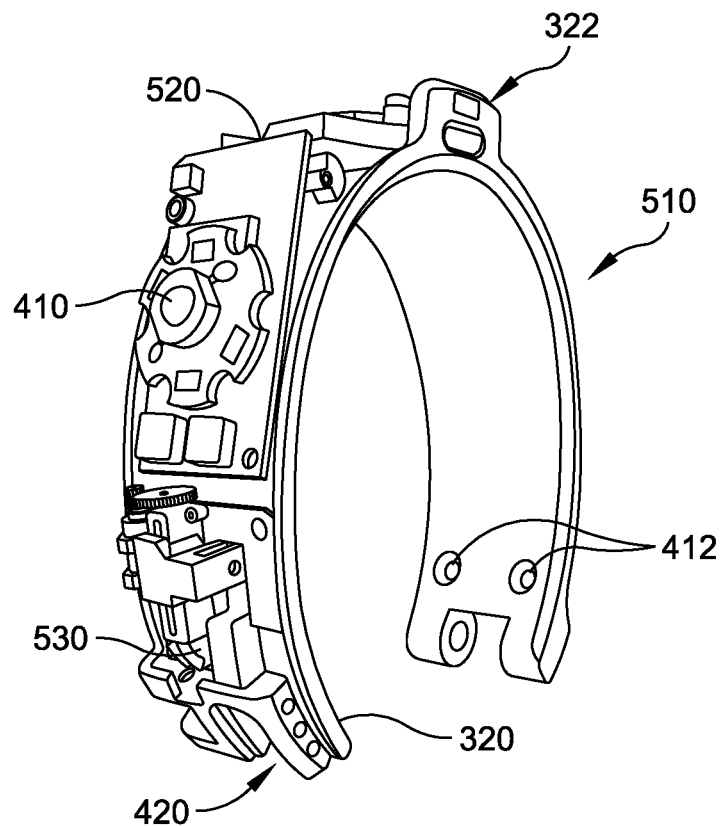
FIG. 5 is a perspective view of an inner shell of the bracelet, with the outer protective cover removed, according to the present disclosure.

FIG. 5 is a perspective view of an inner shell 510 of the bracelet 310, with the outer protective cover removed, according to the present disclosure. The details of the inner shell are shown in greater detail, and include the charging port 322, vibration alert motor 520, a LED light source 410, a micro lock motor 530 for locking the double lock 314 (with receiver 420 and appendage 422), the locking receiver 420 and the locking key port 320.

Figure 6:
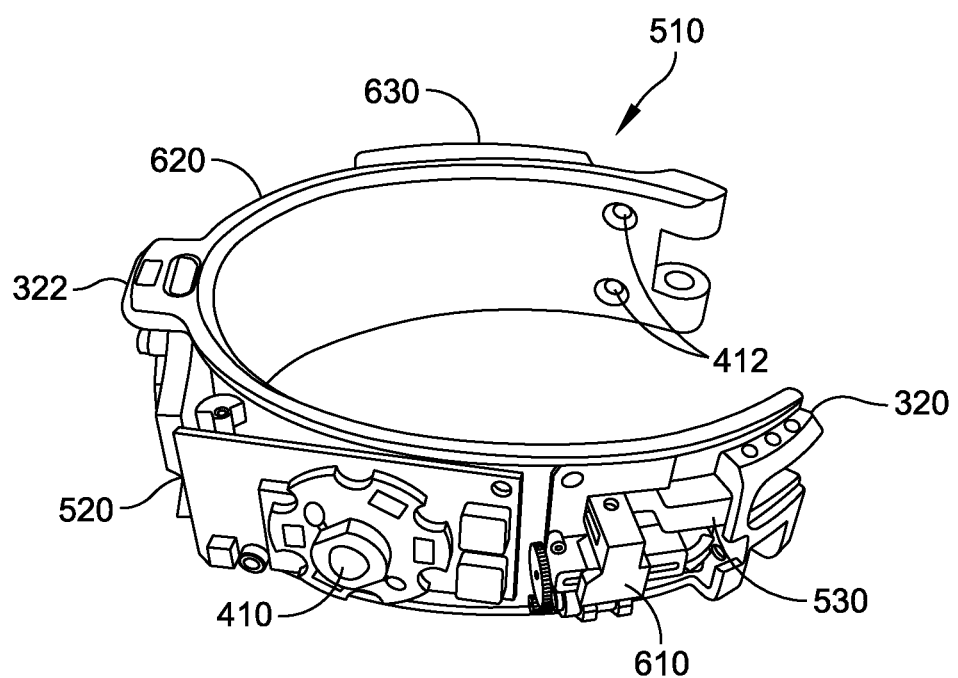
FIG. 6 is a perspective side view of the inner shell of FIG. 5.

FIG. 6 is a perspective side view of the inner shell 510 of FIG. 5. An audible alert sound chip 610 is provided on the inner shell 510 for providing the sound alert on the bracelet. The inner shell 510 also includes a GPS, Cellular, and WiFi chipset 620 for providing communication to the various GPS, Cellular, and WiFi networks. A rechargeable battery 630 is included in the inner shell so that the bracelet is provided with constant power. The rechargeable battery 630 can be coupled with an external battery and charging unit (see., e,g., unit 900 shown in FIG. 9) or may be recharged by USB or household battery pack charger, all shown in FIG. 9.

The outer shell (310) can be manufactured with composite plastics, metals, rubber, silicone, and other materials to add strength. The focus of the outer shell is security and the materials are incorporated to provide tamper and water proof reliability along with a comfortably engineered, wearable product. The inner shell (510) is comprised of similar materials to ensure a platform to house the numerous components for highest marks in offering shock, vibration, tamper and water resistance efficiencies. As will be appreciated herein, the first alert includes a silent vibration notification, the second alert includes a flashing LED light that also acts as a low battery indicator, and the third alert includes a high decibel audio alert.

FIG. 7 is a perspective view of the digital locking key 700 used in conjunction with the bracelet, according to the present disclosure. This digital locking key 700 is configured to engage with the locking key port 320 shown in FIGS. 3-4.

FIG. 8 is a plan view of an internal component of the bracelet shown on the printed circuit board, according to the present disclosure. The internal components of the bracelet are shown on a printed flex circuit board 800. The internal components on the board 800 include a charging port 810, the micro-lock motor 530, the LED light source 410, the sound chip 610, a vibration alert motor 520, a GPS/Cellular/WiFi chipset 620, a power wire 820 coupled to the rechargeable battery 630, a GPS cellular and WiFi antenna 830, and a tamper resistant alert wire 840. In some embodiments, both the victim and the offender bracelets include the tamper resistant alert wire 840 so that there cannot be tampering of either bracelet. In some embodiments, only the offender bracelet includes the tamper resistant wire 840.

FIG. 9 is a perspective view of an external battery and charging unit used in conjunction with the bracelet, according to the present disclosure. The external battery and charging unit 900 can be configured to be worn by a user to extend the life of the bracelet for recharging the rechargeable battery on the go. The external battery and charging unit 900 can be coupled to a USB to micro USB charging cable to allow for micro USB or USB charging of the rechargeable battery via the charging port 810. A household 110V battery pack charger 920 can be coupled to the external battery and charging unit 900 to charge the external battery 900. The external battery pack extends the users wearable time and also provides a recharging capability for the bracelet.

Figure 10:
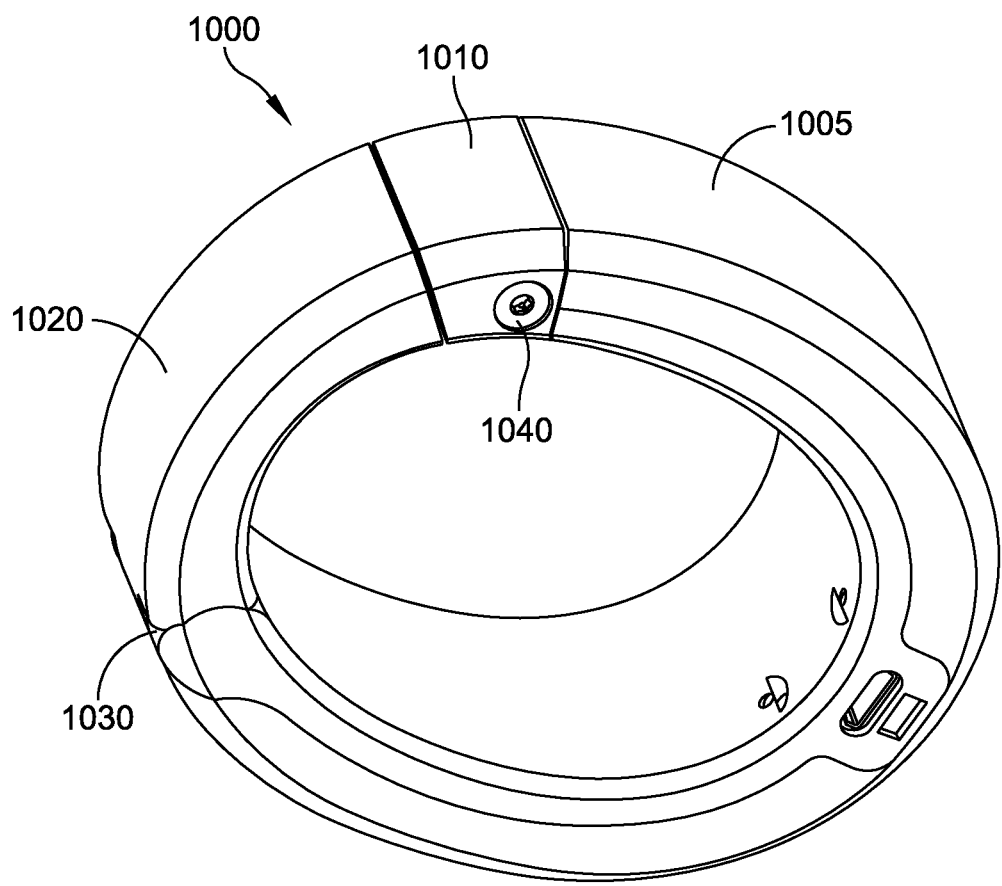
FIG. 10 is a perspective view of a bracelet, shown in a closed position, and including a mechanical locking system, according to the present disclosure.
Figure 13:
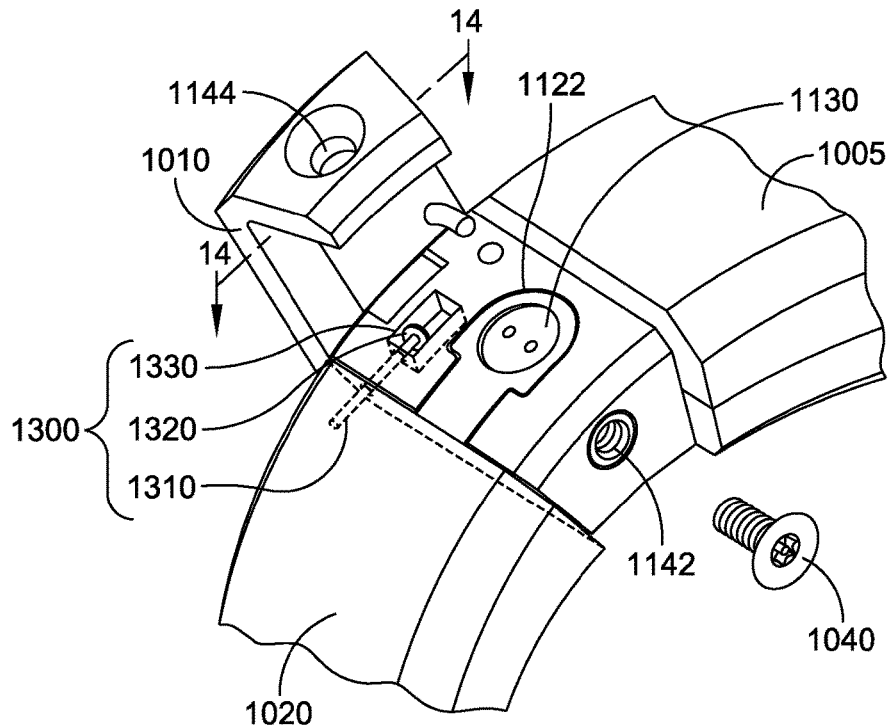
FIG. 13 is a partial view of the bracelet of FIG. 10, showing a hinged fastener portion in the open position, with a first fastener removed, and further including a third locking fastener, according to the present disclosure.
Figures 14, 15:
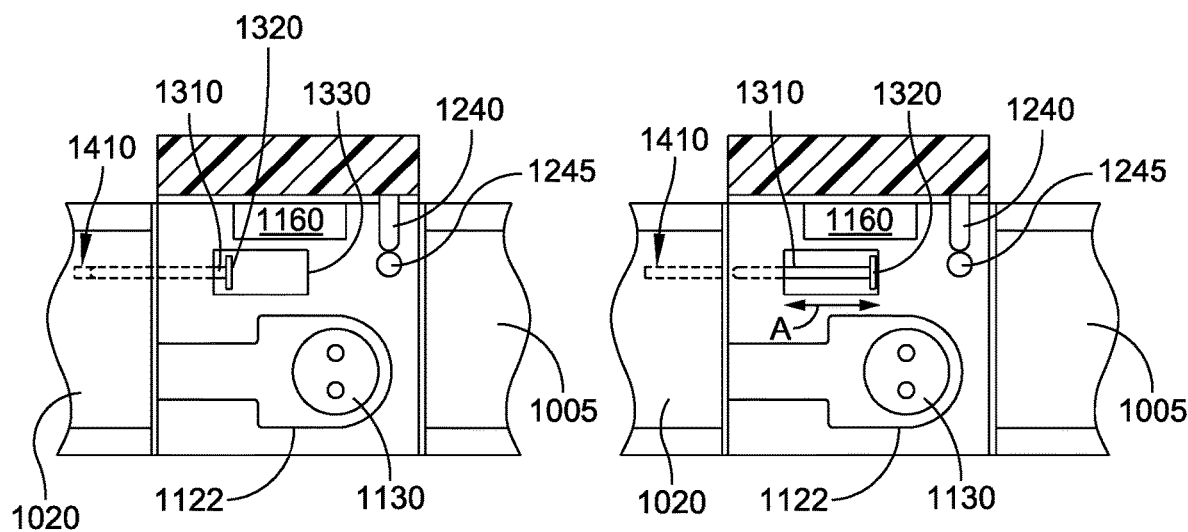
FIG. 14 is a cross-sectional view as taken along line 14-14 of FIG. 13, and showing the inner components of the third locking fastener when in the engaged position, according to the present disclosure.
FIG. 15 is a cross-sectional view as taken along line 14-14 of FIG. 13, and showing the inner components of the third locking fastener, illustrating the movement of the third locking fastener and showing the third locking fastener in the disengaged position, according to the present disclosure.

FIG. 10 is a perspective view of a bracelet, shown in a closed position, and including a mechanical locking system, according to the present disclosure. In this example implementation, the mechanical locking system shown in FIGS. 10-12 includes two fasteners, however it is expressly contemplated that one of the fasteners could be omitted to provide only a single fastener, or that an additional third fastener could be provided, as shown in FIGS. 13-15, to provide the desired mechanical locking system. Further, as will be appreciated, each fastener can require a separate, different tool in order to unfasten the particular fastener, thus adding still a further level of security to the bracelet.

Figure 11:
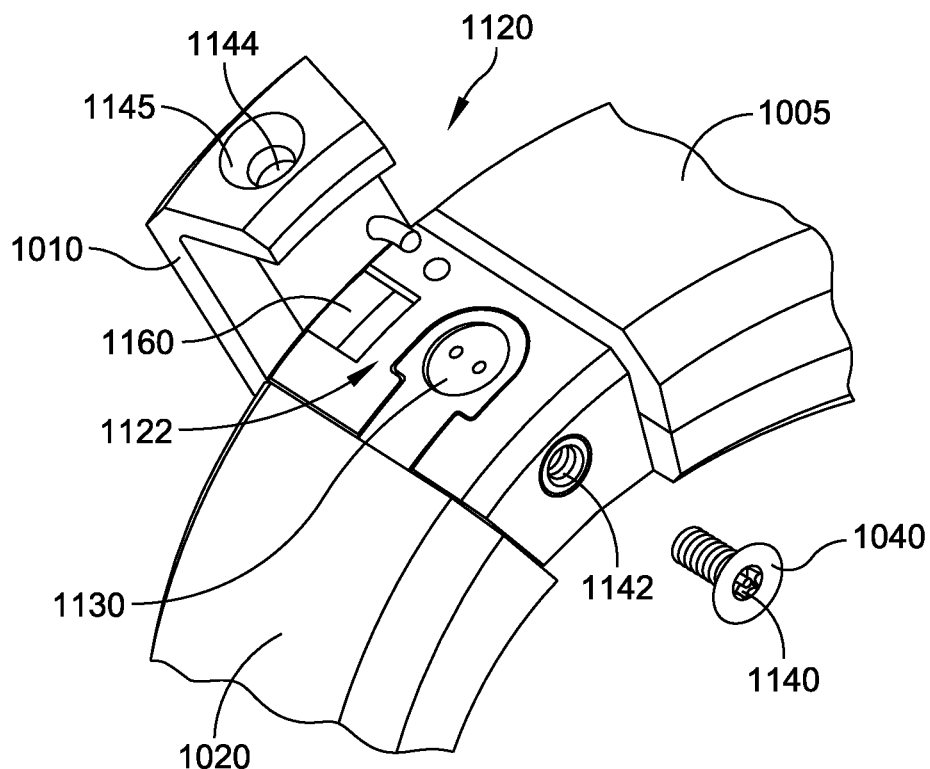
FIG. 11 is a partial view of the bracelet of FIG. 10, showing a hinged fastener portion in an open position, with a first fastener removed from the mechanical locking system, according to the present disclosure.

With reference to FIG. 10, the bracelet 1000 is in the form of a band having a main body portion 1005, a hinged locking gate portion 1020 that is hinged to the main body portion by a hinge 1030, and a hinged fastener portion 1010 that is likewise hinged to the main body portion (via hinge 1160, shown in FIG. 11). The hinge 1030 of the hinged locking gate portion 1020 is hinged in a direction perpendicular to the hinge of the hinged fastener portion 1010. The hinged locking gate 1020 can be locked to the main body portion 1005 by a fastener (for example, fastener 1130 shown in FIGS. 11-12) or can be secured to the main body 1005 by the fastening of the hinged fastener portion 1010, so as to provide two separate fasteners. In some instances, only a single fastener, depending upon the particular application for the bracelet. The hinged fastener portion 1010 is secured to the main body by a fastener 1040, which may be a screw or other appropriate fastener. The internal components of the bracelet 1000 can be the same or substantially similar to those disclosed in relation to FIGS. 1-9 herein and may include fewer or additional components, as will be appreciated in light of the present disclosure.

FIG. 11 is a partial view of the bracelet of FIG. 10, showing a hinged fastener portion 1010 in an open position, with a first fastener 1130 having been removed from the mechanical locking system, according to the present disclosure. The locking system 1120 in this example implementation includes a first fastener 1130 that secures the appendage 1122 of the hinged locking gate portion 1020 to the main body portion 1005. The locking system 1120 also includes a second fastener 1040 that is received within the opening 1142, which may be threaded to receive a threaded fastener. The opening 1142 can be approximately 1.5 millimeters (mm) in diameter and the fastener 1040 can be approximately 9 mm in length. The first fastener 1130 may have a customer pattern (two holes in this instance) that receives a special, customized tool to unlock the fastener 1130 Likewise, the second fastener 1040 may have a custom pattern 1140 that receives a special-milled, customized tool to unlock the fastener 1040. The hinged fastener portion 1010 includes an opening 1144 for receiving the fastener 1040, which may include a beveled edge 1145 for seating the head of the fastener 1040.

FIG. 11 also illustrates a first step in removal of the bracelet 1000 from a wearer. The first step is to remove the fastener 1040 and then open the hinged fastener portion 1010, as shown, to thereby reveal the second fastener. The second step is the completely removal of the hinged locking gate portion 1020 from the main body 1005 of the bracelet 1000 is illustrated in FIG. 12.

Figure 12:
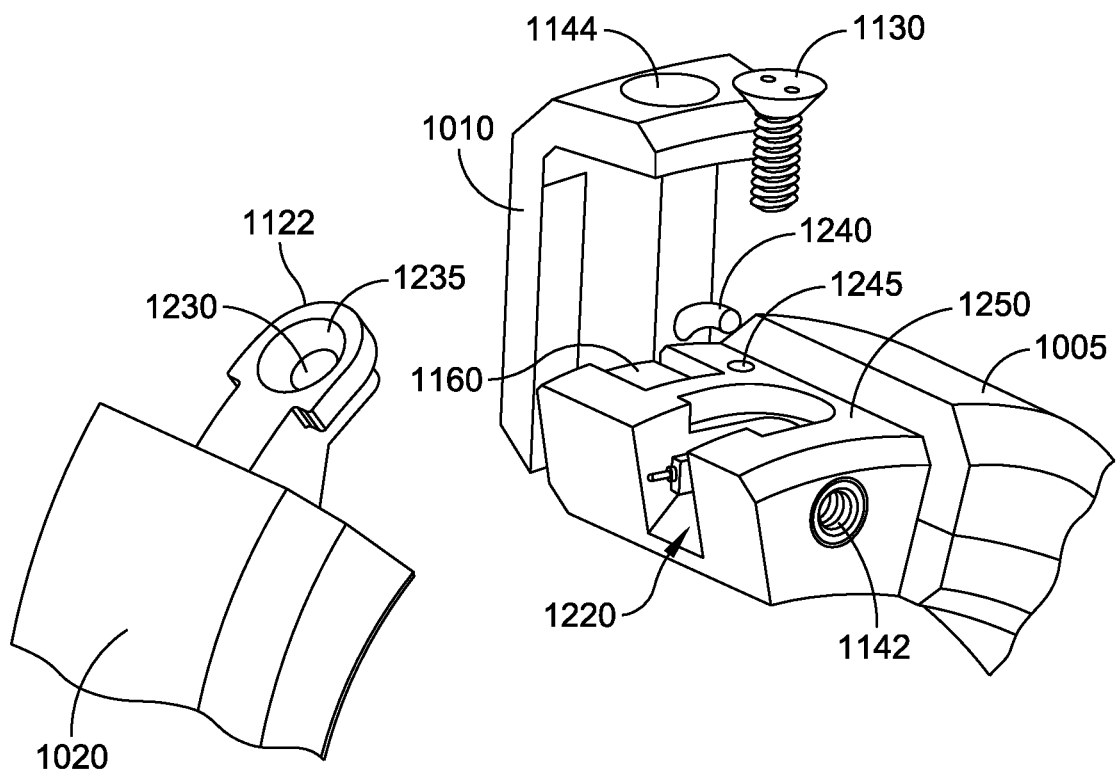
FIG. 12 is a partial view of the bracelet of FIG. 10, showing the hinged fastener portion in the open position and showing the hinged locking gate in an open position, with a second fastener removed from the mechanical locking system, according to the present disclosure.

FIG. 12 is a partial view of the bracelet of FIG. 10, showing the hinged fastener portion 1010 in the open position and showing the hinged locking gate 1020 in an open position, with a second fastener 1130 removed from the mechanical locking system, according to the present disclosure. In this second step, the second fastener 1130 has been removed, and the appendage 1122 is separated from the receiver 1220 on the main body portion 1005. This allows the bracelet to be completely removed from the wearer. The appendage 1122 includes an opening 1230 for receiving the fastener 1130 and also may include a beveled edge 1235 to accommodate the shape of the head of the fastener 1130.

The hinged fastener portion 1010 may include a protrusion 1240 that is received within a small hole 1245 in the main body portion 1005. The main body portion 1005 may further be recessed at 1250 to accommodate receiving the hinged fastener portion 1010 and provide a smooth exterior surface for the bracelet 1000.

Note that the first fastener 1040 and the second fastener 1130 are perpendicular with respect to each other. This feature enhances rigidity of the bracelet and security of the system. Further, note that in the locked position, the hinged fastener portion 101 will overlap the appendage of the hinged locking gate portion 1005 and will also overlap the recessed portion of the main body portion 1005.

FIG. 13 is a partial view of the bracelet of FIG. 10, showing a hinged fastener portion 1010 in the open position, with a first fastener 1040 removed, and further including a third locking fastener 1300, according to the present disclosure, which as shown is in the form of a sliding pin. The locking fastener may be included in the bracelet 1000 to provide a third level of locking for the mechanical locking system and thus additional security to the device.

As shown in FIG. 13, the first fastener 1130 is perpendicular to the second fastener 1040, and the first fastener 1130 is likewise perpendicular to the third fastener 1300. The second and third fasteners are likewise perpendicular with respect to each other when the device is in the locked position.

The third locking fastener includes a cylindrical base post 1110 and a flat top 1320 that is received within an opening 1330 on the main body portion 1005. The cylindrical base post 1310 slides within a hollow shaft of the hinged locking gate portion 1020, as shown in greater detail in FIGS. 14-15. It will be appreciated that although the base post 1310 is shown as being cylindrical, any appropriate shape, including a small threaded screw, could be implemented to engage the main body portion 1005 and the hinged locking gate portion 1020 in the manner as shown.

FIG. 14 is a cross-sectional view as taken along line 14-14 of FIG. 13, and showing the inner components of third locking fastener when in the engaged position, according to the present disclosure. As shown, the cylindrical base post 1310 is received within a hollow shaft 1410 in the hinged locking gate portion 1020. The flat top 1320 of the third locking fastener prevents further movement of the fastener. The post 1310 has a length of approximately 6 mm and the shaft 1410 has a corresponding length of approximately 3 mm to accommodate the remainder of the post 1310 when engaged with the shaft 1410. The opening 1330 accommodates the flat top 1320 and allows for movement of the flat top so as to unlock the third locking fastener 1300, as shown in FIG. 15.

FIG. 15 is a cross-sectional view as taken along line 14-14 of FIG. 13, and showing the inner components of the third locking fastener, illustrating the movement of the third locking fastener and showing the third locking fastener in the disengaged position, according to the present disclosure. The flat top 1320, and thus the corresponding cylindrical base post 1310, have been slid in the direction of arrow A so that the post 1310 is no longer engaged with the hollow shaft 1410. This allows the bracelet to be completely unlocked. The third locking fastener 1300 provides an additional level of security for the bracelet to ensure it is not tampered with by a wearer, particularly when the wearer is the offender.

It will be appreciated that the bracelet can be configured differently depending upon the particular use. For example, for a victim-offender scenario, the victim could be provided with a bracelet having only a single fastener (for example, fastener 1040), whereas the offender could be provided with a single fastener, two fasteners, or three fasteners, depending upon the desired level of security. Further, although shown and described generally herein as a "bracelet" the systems, devices, and techniques disclosed herein may be applied to an anklet, a headband, or any other device that can be configured to be worn or otherwise secured to an individual (whether an offender or a victim).

Having now described a limited number of embodiments of the present invention, it should now be apparent to those skilled in the art that numerous other embodiments and modifications thereof are contemplated as falling within the scope of the present invention, as defined by the appended claims. Although the principles of the present invention have been described in association with a limited number of embodiments described herein it should be understood that the principles also apply to many other embodiments.

What is claimed is:

1. A device configured to be worn by an offender for alerting a victim of a presence of an offender, the device having a locked position and an unlocked position, the device comprising:
   a GPS receiver configured to receive positional data from a GPS satellite;
   a wireless network transceiver configured to transmit the positional data to a cloud-based monitoring system, wherein the wireless network transceiver comprises a wireless cellular network transceiver or a WiFi transceiver;
   a band having a main body portion, a hinged locking gate portion, and a hinged fastener portion;
   wherein the hinged locking gate portion includes an appendage that is configured to engage with a receiver in the main body portion when the device is in the locked position, and wherein the hinged locking gate portion includes a first opening on the appendage configured to receive a first fastener that secures the hinged locking gate portion to the main body portion;
   wherein the main body includes a second opening and the hinged fastener portion includes a third opening, such that the second opening and the third opening are both configured to receive a second fastener to thereby secure the hinged fastener portion to the main body when the device is in the locked position;

and wherein the first fastener comprises a first screw having a first type of screw head configured to receive a first specialized tool and wherein the second fastener comprises a second screw having a second type of screw head configured to receive a second specialized tool, different from the first specialized tool.

2. The device of claim 1, further comprising a fourth opening on the main body that receives the first fastener to secure the hinged locking gate portion to the main body.

3. The device of claim 2, wherein the second and third openings are perpendicular to the first and fourth openings when the device is in the locked position.

4. The device of claim 1, further comprising a third locking fastener configured to secure the main body portion to the hinged locking gate portion in a direction that is perpendicular to the first fastener.

5. The device of claim 1, wherein the main body defines a recessed portion that is recessed along at least three edges and to engage the hinged fastener portion when the device is in the locked position.

6. A device having a locked position and an unlocked position, the device comprising:
   a GPS receiver configured to receive positional data from a GPS satellite;
   a wireless network transceiver configured to transmit the positional data to a cloud-based monitoring system, wherein the wireless network transceiver comprises a wireless cellular network transceiver or a WiFi transceiver or other wireless network transceiver;
   a band having a main body portion, a hinged locking gate portion, and a hinged fastener portion;
   a first fastener that secures the hinged locking gate portion to the main body portion when the device is in the locked position;
   a second fastener that secures the hinged fastener portion to the main body portion when the device is in the locked position; and
   a third locking mechanism configured to secure the main body portion to the hinged locking gate portion in a direction that is perpendicular to the first fastener; wherein
   the third locking mechanism comprises a cylindrical base post and a flat top, wherein the cylindrical base post is configured to engage a hollow shaft to engage and disengage the third locking mechanism from the hinged locking gate portion.

7. A device having a locked position and an unlocked position, the device comprising:
   a GPS receiver configured to receive positional data from a GPS satellite;
   a wireless network transceiver configured to transmit the positional data to a cloud-based monitoring system, wherein the wireless network transceiver comprises a wireless cellular network transceiver or a WiFi transceiver or other wireless network transceiver;
   a band having a main body portion, a hinged locking gate portion, and a hinged fastener portion;
   a first fastener that secures the hinged locking gate portion to the main body portion when the device is in the locked position; and
   a second fastener that secures the hinged fastener portion to the main body portion when the device is in the locked position;
   wherein the first fastener is perpendicular with respect to the second fastener when the device is in the locked position.

8. A device having a locked position and an unlocked position, the device comprising:
   a GPS receiver configured to receive positional data from a GPS satellite;
   a wireless network transceiver configured to transmit the positional data to a cloud-based monitoring system, wherein the wireless network transceiver comprises a wireless cellular network transceiver or a WiFi transceiver or other wireless network transceiver;
   a band having a main body portion, a hinged locking gate portion, and a hinged fastener portion;
   a first fastener that secures the hinged locking gate portion to the main body portion when the device is in the locked position; and
   a second fastener that secures the hinged fastener portion to the main body portion when the device is in the locked position;
   wherein a first hinge of the hinged locking gate portion is perpendicular to a second hinge of the hinged fastener portion.

9. A device having a locked position and an unlocked position, the device comprising:
   a GPS receiver configured to receive positional data from a GPS satellite;
   a wireless network transceiver configured to transmit the positional data to a cloud-based monitoring system, wherein the wireless network transceiver comprises a wireless cellular network transceiver or a WiFi transceiver or other wireless network transceiver;
   a band having a main body portion, a hinged locking gate portion, and a hinged fastener portion;
   a first fastener that secures the hinged locking gate portion to the main body portion when the device is in the locked position; and
   a second fastener that secures the hinged fastener portion to the main body portion when the device is in the locked position;
   wherein the first fastener is configured to receive a first specialized tool and wherein the second fastener is configured to receive a second specialized tool, different from the first specialized tool.

10. A device having a locked position and an unlocked position, the device comprising:
   a GPS receiver configured to receive positional data from a GPS satellite;
   a wireless network transceiver configured to transmit the positional data to a cloud-based monitoring system, wherein the wireless network transceiver comprises a wireless cellular network transceiver or a WiFi transceiver or other wireless network transceiver;
     a band having a main body portion, a hinged locking gate portion, and a hinged fastener portion;
     wherein the hinged locking gate portion is hinged to the main body along a first direction;
     wherein the hinged fastener portion is hinged to the main body along a second direction that is perpendicular to the first direction.

11. The device of claim 10, wherein the hinged locking gate portion includes an appendage that is configured to engage with a receiver on the main body portion when the device is in the locked position.

12. The device of claim 11, further comprising:
   a first opening on the appendage;
   a second opening in the receiver;

a first fastener configured to be received through the first and second openings to secure the hinged locking gate portion to the main body portion when the device is in the locked position;
a third opening on the hinged fastener portion;
a fourth opening on the main body portion; and
a second fastener configured to be received through the third and fourth openings to secure the hinged fastener portion to the main body portion when the device is in the locked position.

13. The device of claim 12, wherein the hinged fastener portion overlaps the first fastener and the first fastener is perpendicular to the second fastener when the device is in the locked position.

14. The device of claim 12, wherein the device is unlocked by first unlocking the first fastener, then opening the hinged fastener portion, then unlocking the second fastener, and then opening the hinged locking gate portion.

15. The device of claim 10, further comprising a third locking fastener configured to secure the hinged locking gate portion to the main body portion in a direction perpendicular to the first fastener that is configured to secure the hinged locking gate portion to the main body portion.

16. The device of claim 15, wherein the third locking mechanism comprises a slide pin having a cylindrical base post and a flat top, wherein the cylindrical base post is configured to engage a hollow shaft to engage and disengage the third locking mechanism from the hinged locking gate portion.

17. The device of claim 16, further comprising an opening that accommodates the flat top of the third locking mechanism.

\* \* \* \* \*